United States Patent [19]

Shih et al.

[11] Patent Number: 4,927,667
[45] Date of Patent: May 22, 1990

[54] AQUEOUS PROCESS FOR PREPARING WATER-RESISTANT COATINGS OF HYDROPHOBIC COPOLYMERS MADE FROM HYDROPHILIC MONOMERS

[75] Inventors: Jenn S. Shih, Paramus; Terry E. Smith, Morristown; Robert B. Login, Oakland, all of N.J.

[73] Assignee: GAF Chemicals Corporation, Wayne, N.J.

[21] Appl. No.: 370,208

[22] Filed: Jun. 22, 1989

[51] Int. Cl.$^5$ .............................................. B65B 33/04
[52] U.S. Cl. ................................... 427/154; 427/385.5; 427/389.7; 524/96; 524/548; 524/808
[58] Field of Search ......................... 524/96, 808, 548; 427/154, 385.5, 389.7

[56]  References Cited
U.S. PATENT DOCUMENTS 3,044,873  7/1962  Haas ..................................... 526/264

OTHER PUBLICATIONS

B. F. Goodrich Product Literature GC-73, entitled "Carboset ® Resins".

Primary Examiner—Joseph L. Schofer
Assistant Examiner—John J. Guarriello
Attorney, Agent, or Firm—Walter Katz; Marilyn J. Maue; Joshua J. Ward

[57]  ABSTRACT

An aqueous process is described for preparing water-resistant coatings of hydrophobic copolymers of a predetermined composition. The hydrophobic copolymers are made from hydrophilic comonomers such as a vinyl lactam and a polymerizable carboxylic acid. The hydrophobic copolymers are rendered water soluble with a volatile neutralizing agent, such as ammonium hydroxide, then coated onto a substrate and heated to provide the water-resistant coating, and, if desired, redissolved in an aqueous alkaline solution.

6 Claims, No Drawings

AQUEOUS PROCESS FOR PREPARING WATER-RESISTANT COATINGS OF HYDROPHOBIC COPOLYMERS MADE FROM HYDROPHILIC MONOMERS

BACKGROUND OF THE INVENTION

1. Field of the Invention

This invention relates to an aqueous process for preparing water-resistant coatings, and, more particularly, to an aqueous process for providing coatings of hydrophobic copolymers made from hydrophilic monomers, which can be easily redissolved.

2. Description of the Prior Art

It is well known that acrylic coating resins which are water soluble can be rendered water insoluble, or hydrophobic, by incorporation of hydrophobic monomers in the resins. In a volatile basic solvent, such copolymers can provide clear, adherent, water resistant, temporary protective coatings which can be removed easily with a dilute alkaline solution. See B. F. Goodrich Product Literature GC-73, entitled "Carboset ® Resins". However, these resins are limited by the requirement that a hydrophobic monomer be part of the polymer.

Accordingly, an object of the present invention is to provide an aqueous process for preparing water resistant coatings of hydrophobic copolymers made from hydrophilic monomers.

Another object of the invention is to provide an aqueous process for preparing water-resistant coatings of hydrophobic copolymers made from a predetermined compositional mixture of a hydrophilic vinyl lactam monomer and a hydrophilic polymerizable carboxylic acid monomer.

These and other objects and features of the invention will be made apparent from the following description thereof.

SUMMARY OF THE INVENTION

What has been discovered herein is that water resistant coatings of hydrophobic copolymers made from hydrophilic monomers may be prepared by an aqueous process. The hydrophobic polymers of the invention are themselves water insoluble but are rendered water soluble by addition of a volatile neutralizing agent which brings the aqueous solution to a pH of at least about 4. The aqueous copolymer solutions then can be coated onto a suitable substrate. Upon removal of the volatile neutralizing agent, e.g. by heating, the coatings become water resistant. If desired, application of an aqueous base will redissolve the coating.

DETAILED DESCRIPTION OF THE INVENTION

In accordance with the present invention, it has been discovered that a predetermined compositional range of copolymers of a vinyl lactam and a polymerizable carboxylic acid monomers, which monomers and homopolymers thereof are hydrophilic, i.e. water soluble and yield water soluble homopolymers, are hydrophobic, i.e. water insoluble. This unexpected property is believed to result from strong hydrogen bonding between the functional groups in the respective monomers thus producing a hydrophobic polymer.

In particular, within a compositional range of about 15–85% by wt. vinyl lactam and about 85–15% by wt. polymerizable carboxylic acid monomers, the copolymer is insoluble in water.

Coatings of insoluble copolymers having such composition may be prepared by an aqueous process by first treating the copolymer with a volatile neutralizing agent until the pH of the aqueous solution reaches at least about 4. The resulting aqueous basic solution containing the copolymer and the volatile neutralizing agent then is applied as a coating onto a suitable substrate. Upon drying (heat may be required), the volatile neutralizing agent is removed from the coating, producing a water-resistant coating of the copolymer. Then, if desired, the coating may be solubilized in aqueous base.

Suitable vinyl lactams for use herein include vinyl pyrrolidone and vinyl caprolactam, or mixtures thereof. Suitable polymerizable carboxylic acid monomers include acrylic acid, methacrylic acid and itaconic acid, and mixtures thereof.

Suitable volatile neutralizing agents for use herein include ammonium hydroxide and organic amines such as morpholine, or mixtures thereof.

Copolymers of vinyl pyrrolidone and acrylic acid within the compositional range suitable for use herein may be prepared in accordance with the precipitation polymerization method described in detail in copending patent application Ser. No. 334,420, filed Apr. 7, 1989, by the same inventors and assigned to GAF Corporation. In this method, white powders of the desired copolymer composition are precipitated from aliphatic hydrocarbon solvents.

The present invention is particularly useful for preparing coatings and adhesives.

The invention will now be described with reference to the following examples.

EXAMPLE 1

2 g. each of three poly(vinyl pyrrolidone/acrylic acid) (wt. ratios 75/25, 50/50, 25/75% by wt.) copolymer samples were dissolved in 98 g. of a 0.1N ammonium hydroxide solution. The solutions then were cast onto plate glass to form a 0.006 inch thick film. The film was dried in forced air oven at 100° C. for 3 hours, then transferred to a vacuum oven heated to 130° C. and held overnight (16 hrs.). The copolymer was insoluble in water. Thereafter, it was dissolved in an aqueous 0.1N ammonium hydroxide or a 0.1N sodium hydroxide solution.

What is claimed is:

1. An aqueous process for preparing water-resistant coatings of hydrophobic copolymers made from hydrophilic monomers which comprises:
   (a) providing a hydrophobic copolymer including (i) about 15–85% by wt. of a hydrophilic vinyl lactam and (ii) about 85–15% by wt. of a hydrophilic polymerizable carboxylic acid which copolymer is water-resistant within said ranges,
   (b) forming an aqueous solution of said hydrophobic copolymer in a volatile neutralizing agent,
   (c) applying said solution to a substrate to form a coating of said copolymer thereon, and
   (d) removing said volatile neutralizing agent from said coating to convert it into a water-resistant coating.

2. A process according to claim 1 wherein said hydrophilic vinyl lactam is vinyl pyrrolidone or vinyl caprolactam, or mixtures thereof, and said hydrophilic polymerizable carboxylic acid is acrylic acid, methacrylic acid and itaconic acid, and mixtures thereof.

3. A process according to claim 1 which includes a step (e) which comprises dissolving said water resistant coating in an aqueous alkaline solution having a pH of at least about 4.

4. A process according to claim 1 wherein said volatile neutralizing agent is ammonia or an organic amine.

5. A process according to claim 4 wherein said volatile neutralizing agent is ammonia.

6. A process according to claim 1 wherein step (d) is carried out with heating.

* * * * *